(12) United States Patent
Lawrence et al.

(10) Patent No.: US 8,319,150 B2
(45) Date of Patent: Nov. 27, 2012

(54) CONTINUOUS MOTION LASER SHOCK PEENING

(75) Inventors: Wayne Lee Lawrence, Sardinia, OH (US); Paul Michael Perozek, Cincinnati, OH (US); Mark Samuel Bailey, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 1606 days.

(21) Appl. No.: 10/887,634

(22) Filed: Jul. 9, 2004

(65) Prior Publication Data

US 2006/0006158 A1    Jan. 12, 2006

(51) Int. Cl.
*B23K 26/00* (2006.01)
*B23K 26/02* (2006.01)
*B23K 26/08* (2006.01)
*H01S 3/00* (2006.01)
*C21D 1/09* (2006.01)
*C22F 3/00* (2006.01)

(52) U.S. Cl. .......... 219/121.81; 219/121.82; 219/121.85

(58) Field of Classification Search ............. 219/121.68, 219/121.69, 121.6–121.62, 121.78–121.83, 219/121.85

See application file for complete search history.

(56) References Cited

U.S. PATENT DOCUMENTS

| | | | |
|---|---|---|---|
| 3,806,829 A * | 4/1974 | Duston et al. ............. 372/38.01 |
| 3,850,698 A | 11/1974 | Mallozzi et al. |
| 4,287,486 A * | 9/1981 | Javan ............................. 372/20 |
| 4,417,330 A * | 11/1983 | Hazel et al. ................ 369/44.26 |
| 4,482,225 A * | 11/1984 | Moyroud et al. ............. 396/559 |
| 4,492,843 A * | 1/1985 | Miller et al. ............. 219/121.63 |
| 4,801,352 A * | 1/1989 | Piwczyk ..................... 156/345.5 |
| 4,937,421 A | 6/1990 | Ortiz, Jr. et al. |
| 4,952,789 A * | 8/1990 | Suttie ........................ 219/121.68 |
| 4,969,169 A * | 11/1990 | Forsyth ........................... 378/34 |
| 4,980,718 A * | 12/1990 | Salter et al. ...................... 355/53 |
| 5,095,258 A * | 3/1992 | Drits et al. ..................... 318/569 |
| 5,127,019 A | 6/1992 | Epstein et al. |
| 5,131,957 A | 7/1992 | Epstein et al. |
| 5,262,613 A * | 11/1993 | Norris et al. ............. 219/121.68 |
| 5,467,675 A * | 11/1995 | Dow et al. ...................... 82/1.11 |
| 5,674,328 A * | 10/1997 | Mannava et al. ............. 148/525 |
| 5,744,781 A * | 4/1998 | Yeaton ..................... 219/121.84 |
| 5,756,965 A | 5/1998 | Mannava |
| 5,925,268 A * | 7/1999 | Britnell ..................... 219/121.63 |

(Continued)

FOREIGN PATENT DOCUMENTS

JP            362134838 A  *  6/1987

(Continued)

*Primary Examiner* — Samuel M Heinrich
(74) *Attorney, Agent, or Firm* — General Electric Company; Sushupta T. Sudarshan; David J. Clement

(57) ABSTRACT

A continuous motion laser shock peening apparatus and method for laser shock peening a workpiece. A laser controller modulates and fires a laser beam from a laser unit. A motion controller is controllably connected to a manipulator and to the laser controller to fire the laser beam based on axis position feedback from a speed control of the motion controller. The laser controller has a standby mode for flashing a laser flash lamp at a flash rate without triggering the laser beam and a firing mode that triggers and fires the laser beam in laser beam pulses. The laser controller includes a synchronizing means for synchronizing a triggering signal provided to the laser interface controller by the computerized motion controller to fire the laser beam pulses and the flash rate substantially at a time when the laser beam pulses are to be generated.

32 Claims, 5 Drawing Sheets

U.S. PATENT DOCUMENTS

| | | | |
|---|---|---|---|
| 5,932,120 A | 8/1999 | Mannava et al. | |
| 5,985,056 A * | 11/1999 | McCay et al. | 148/511 |
| 5,987,042 A * | 11/1999 | Staver et al. | 372/30 |
| 6,016,324 A | 1/2000 | Rieger et al. | |
| 6,084,202 A * | 7/2000 | Okazaki et al. | 219/121.61 |
| 6,108,357 A | 8/2000 | Unternahrer | |
| 6,110,318 A * | 8/2000 | Goodman | 156/272.2 |
| 6,144,007 A * | 11/2000 | Levin | 219/121.62 |
| 6,144,012 A * | 11/2000 | Dulaney et al. | 219/121.85 |
| 6,198,069 B1 | 3/2001 | Hackel et al. | |
| 6,300,594 B1 * | 10/2001 | Kinoshita et al. | 219/121.69 |
| 6,305,985 B1 * | 10/2001 | Akiha | 439/607 |
| 6,339,203 B1 * | 1/2002 | Nakamura et al. | 219/69.2 |
| 6,373,876 B1 | 4/2002 | Dulaney et al. | |
| 6,385,228 B1 | 5/2002 | Dane et al. | |
| 6,483,076 B1 | 11/2002 | O'Loughlin et al. | |
| 6,539,035 B1 * | 3/2003 | Yoda et al. | 372/6 |
| 6,587,483 B2 | 7/2003 | Kittelmann et al. | |
| 6,886,284 B2 * | 5/2005 | Lizotte | 42/1.01 |
| 6,923,877 B1 * | 8/2005 | Anderson | 148/525 |
| 7,227,098 B2 * | 6/2007 | Bruland et al. | 219/121.69 |
| 2001/0045974 A1 * | 11/2001 | Shoemaker et al. | 347/63 |
| 2003/0160149 A1 * | 8/2003 | Dwyer et al. | 250/208.1 |
| 2003/0183744 A1 * | 10/2003 | Nantel et al. | 250/201.2 |
| 2003/0217997 A1 | 11/2003 | Clauer et al. | |
| 2005/0227455 A1 * | 10/2005 | Park et al. | 438/458 |

FOREIGN PATENT DOCUMENTS

JP 06140690 A * 5/1994

* cited by examiner

CONTINUOUS MOTION LASER SHOCK PEENING

BACKGROUND OF THE INVENTION

1. Field of the Invention

This invention relates to laser shock peening and, more particularly, to apparatus and methods for synchronization of laser firing and motion systems during laser shock peening.

2. Description of Related Art

Laser shock peening (LSP) or laser shock processing, as it is also referred to, is a process for producing a region of deep compressive residual stresses imparted by laser shock peening a surface area of an article. Laser shock peening typically uses one or more radiation pulses from high and low power pulsed lasers to produce an intense shock wave at the surface of an article similar to methods disclosed in U.S. Pat. No. 3,850,698 entitled "Altering Material Properties"; U.S. Pat. No. 4,401,477 entitled "Laser Shock Processing"; and U.S. Pat. No. 5,131,957 entitled "Material Properties". Laser shock peening, as understood in the art and as used herein, means utilizing a pulsed laser beam from a laser beam source to produce a strong localized compressive force on a portion of a surface by producing an explosive force at the impingement point of the laser beam by an instantaneous ablation or vaporization of a thin layer of that surface or of a coating (such as tape or paint) on that surface which forms a plasma.

Laser shock peening is being developed for many applications in the gas turbine engine field, some of which are disclosed in the following U.S. Pat. No. 5,736,965 entitled "On The Fly Laser Shock Peening"; U.S. Pat. No. 5,591,009 entitled "Laser shock peened gas turbine engine fan blade edges"; U.S. Pat. No. 5,531,570 entitled "Distortion control for laser shock peened gas turbine engine compressor blade edges"; U.S. Pat. No. 5,492,447 entitled "Laser shock peened rotor components for turbomachinery"; U.S. Pat. No. 5,674,329 entitled "Adhesive tape covered laser shock peening"; and U.S. Pat. No. 5,674,328 entitled "Dry tape covered laser shock peening", all of which are assigned to the present Assignee.

High energy laser beams, from about 20 to about 50 Joules, or low energy laser beams, from about 3 to about 10 Joules, have been used and other levels are contemplated. See, for example, U.S. Pat. No. 5,674,329 (Mannava et al.), issued Oct. 7, 1997 which discloses LSP processing using high energy lasers and U.S. Pat. No. 5,932,120 (Mannava et al.), issued Aug. 3, 1999 which discloses LSP processing using low energy lasers. Low energy laser beams can be produced using different laser materials such as neodymium doped yttrium aluminum garnet (Nd YAG), Nd:YLF, and others.

Many laser shots must be taken in order to cover a significant area with laser shock peening and, thus, it is desirable to have a continuous LSP process requiring synchronization of laser firing and motion steps and systems. The motion must be effected between the workpiece being laser shock peened and the laser beams so that the laser hits the workpiece at different locations to cover the entire area to be laser shock peened with laser shock peened spots. Without synchronization, the requirement for repeatability needed for laser shock peened spot placement from one pass or layer of spots to the next cannot be met, when processing with a continuous motion. Laser shock peened spots on one layer or pass must hit between spots on previous layers or passes.

Laser shock peening has typically included moving a workpiece to fixed position, the motion is stopped, a laser is fired, and then the motion of the part is started again to reposition the workpiece for the next laser firing. This stop and start motion is repeated until the laser shock peened area or patch is completed. On the fly laser shock peening is disclosed in U.S. Pat. No. 5,756,965 which includes using a fixed constant laser pulse rate with a fixed feed rate motion system that produces overlapping row of laser beam spots. It is desirable to more precisely locate the laser shock peened spot needed for processing non-overlapping shots on one layer and placing laser shock peened spots between existing spots on subsequent layers which overlap laser shock peened spots of an earlier layer.

SUMMARY OF THE INVENTION

A continuous motion laser shock peening apparatus includes a laser unit for generating a laser beam for laser shock peening a workpiece, a motion controller controllably connected to a manipulator for continuously moving and positioning the workpiece, and a laser controller for modulating and firing the laser beam from the laser unit. A laser firing system is used for firing the laser beam from the laser unit. The motion controller is operably connected to the laser controller to fire the laser beam based on axis position feedback from a speed control of the motion controller. An exemplary embodiment of the apparatus includes at least one flash lamp operably disposed for actuating a lasing rod in the laser unit. The laser controller has first and second modes for modulating and firing the laser beam from the laser unit. The first mode is a standby mode for flashing the flash lamp at a flash rate without triggering the laser beam. The second mode is a firing mode that triggers and fires the laser beam in laser beam pulses. The laser controller includes a synchronizing means for synchronizing a triggering signal provided to the laser interface controller by the computerized motion controller to fire laser beam pulses of the laser beam and the flash rate of the flashing of the flash lamp at a time substantially when the laser beam pulses are to be generated.

One exemplary embodiment of the laser shock peening apparatus includes the motion controller operably connected to the laser controller and programmed to fire the laser beam based on a predetermined spacing along one or more axes of the manipulator. The predetermined spacing is based on encoding counts generated by the motion controller and representing distances along the axes.

In another more particular embodiment of the apparatus, an oscillator of the laser unit includes a lasing rod operably disposed between front and rear mirrors and the flash lamp. A shutter is disposed between the front mirror and the lasing rod and a Q-switch is located between the lasing rod and the rear mirror. The Q-switch is controllably connected to the laser controller for triggering and firing the laser beam pulses.

In another more particular alternative embodiment of the apparatus, the oscillator includes the lasing rod operably disposed between front and rear mirrors and the flash lamp. A double Pocel Cell is positioned directly between the oscillator and a high speed shutter along a beam path leading out of the oscillator. The high speed shutter and the double Pocel Cell are controllably connected to the laser controller.

A continuous motion laser shock peening method includes firing laser beam pulses of the laser beam on a laser shock peening surface of a workpiece with a laser unit having an oscillator to form at least a first row of laser shock peened spots with at least a single pass of the laser beam on the laser shock peening surface. The method further includes modulating and controlling the laser unit with a laser interface controller to fire the laser beam on the laser shock peening surface, continuously moving and positioning the workpiece with a manipulator controlled by a computerized motion controller, and firing the laser beam pulses based on axis position feedback from a speed control of the motion controller to the laser interface controller. A more particular embodiment of the method includes placing a header on the triggering signal wherein the header delays the computerized motion controller from firing the laser beam pulse for at least a first pulse of a train of the triggering signal. Another more particular embodiment of the method includes placing start and stop masks at distal ends of a patch area where the laser shock peened patch is to be formed on the laser shock peened surface and firing at least a first one of the laser beam pulses on the start mask on each pass of the laser beam on the laser shock peening surface.

DETAILED DESCRIPTION OF THE INVENTION

Figure 1:
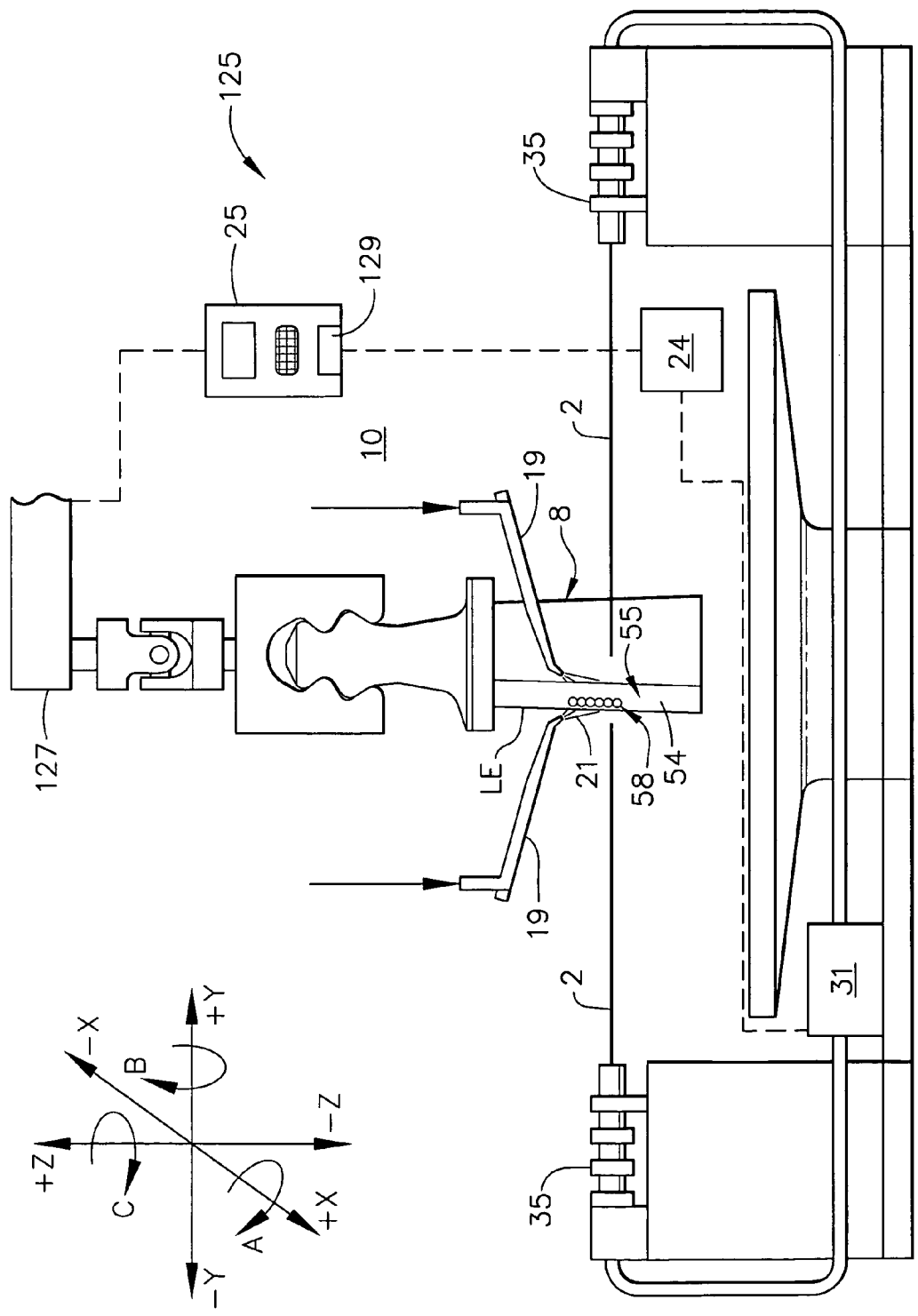
FIG. 1 is a schematical illustration of a continuous motion laser shock peening system.
Figure 2:
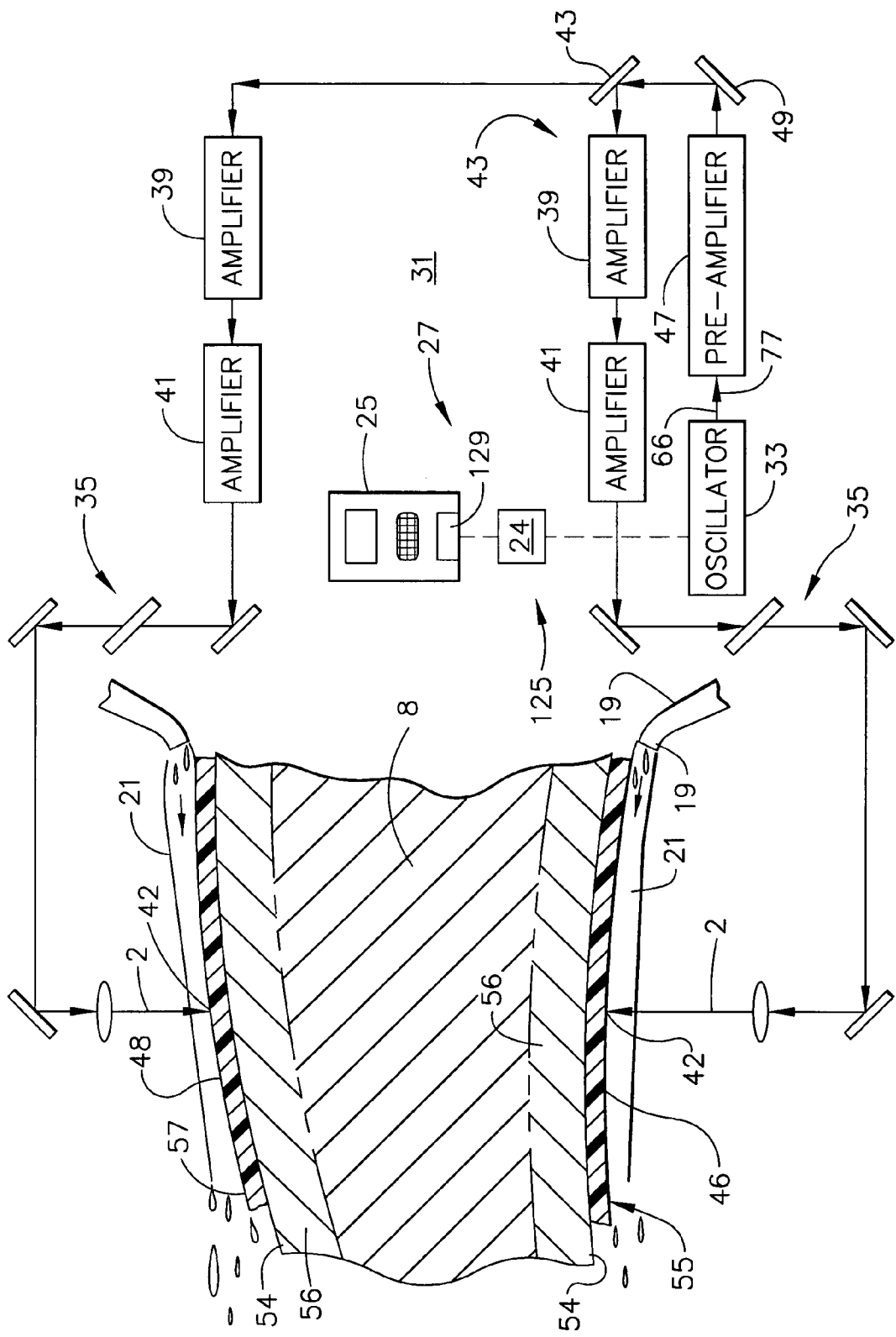
FIG. 2 is a schematical illustration of the laser and optics of the laser shock peening system illustrated in FIG. 1.

Illustrated in FIGS. 1 and 2 is a continuous motion laser shock peening apparatus 10 for laser shock peening an article or workpiece 8 illustrated by a gas turbine engine blade mounted in a multi-axis computer numerically controlled (CNC) manipulator 127. A five-axis computer numerically controlled (CNC) manipulator 127 is illustrated herein, having conventional translational X, Y, and Z axes labelled X, Y, and Z, respectively, in FIG. 1, and conventional first, second, and third rotational axes A, B, and C, respectively, that are well known in CNC machining. The manipulator 127 is used to continuously move and position the blade to provide laser shock peening and, thus, provide continuous motion between the workpiece 8 and stationary laser beams 2. Laser shock peening may be done in a number of various ways using paint or tape as an ablative medium (see in particular U.S. Pat. No. 5,674,329 entitled "Adhesive Tape Covered Laser Shock Peening").

The stationary laser beams 2 are directed towards target areas 42 in on laser shock peening surface 55 of the workpiece 8. The laser shock peening apparatus 10 includes a laser unit 31 having an oscillator 33, a laser interface controller 24, and a computerized motion controller 25. The laser interface controller 24 is used to modulate and control the laser unit 31 to fire the laser beam 2 on a coated or uncoated laser shock peening surface 55. The computerized motion controller 25 is used to control the operation and movement, including speed and positioning, of the manipulator 127. The laser shock peening apparatus 10 further includes a pre-amplifier 47 and a beam splitter 49 along the laser beam path 66. The beam splitter 49 feeds the pre-amplified laser beam into two beam optical transmission circuits 43. Each of the beam optical transmission circuits 43 includes a first amplifier 39, a second and final amplifier 41, and optics 35. The optics 35 include optical elements that transmit and focus the laser beam 2 on the laser shock peening surfaces 55.

The laser shock peening surfaces 55, located in the target areas 42, are illustrated on pressure and suction sides 46 and 48, respectively, of a leading edge LE of the blade represented as the workpiece 8. The laser shock peening surfaces 55 are coated with an ablative coating 57 such as paint or adhesive tape to form coated surfaces as disclosed in U.S. Pat. Nos. 5,674,329 and 5,674,328. The coating 57 provides an ablative medium over which a clear containment medium is placed, such as a fluid curtain of flowing water 21. During laser shock peening, the blade (workpiece 8) is moved while the stationary laser beams 2 are fired through curtains of flowing water 21, dispensed by water nozzles 19, on the laser shock peening surfaces 55. The laser shock peening process is typically used to form overlapping circular laser shock peened spots 58 on laser shock peened surfaces 54.

Laser beam shock induced deep compressive residual stresses are formed in compressive pre-stressed regions 56. The compressive residual stresses are generally about 50-150 KPSI (Kilo Pounds per Square Inch) and extend from the laser shock peened surfaces 54 to a depth of about 20-50 mils into the pre-stressed regions continuously. The laser beam shock induced deep compressive residual stresses are produced by repetitively firing the laser beams 2 which are typically defocused plus or minus a few hundred mils with respect to the laser shock peening surface 55.

The laser unit 31 is more particularly illustrated in FIG. 2. The oscillator 33 in the laser unit 31 has only a single lasing rod 36. The exemplary oscillator 33 is a conventional pulsed YAG free running oscillator. An example of such an oscillator is a Convergent-Prima P50 as well as other YAG lasers primarily manufactured for drilling. These lasers generate between 1 and 50 Joules, at 1 to over 100 Hz, at pulse widths from a few hundred microseconds to over 1 millisecond. They are commercially available from several vendors such as Trumpf, Rofin Sinar, Lasag, and JK. The laser may be operated with the parameters combined in many ways with the average power (e.g. rep rate×energy/pulse) less than 500 Watts and typically less than 200 Watts. The free running YAG laser oscillator 33 is pumped by a pair of flash lamps 70 which actuate the lasing rod 36.

The continuous motion laser shock peening apparatus 10 provides continuous laser shock peening by continuously moving the workpiece 8 while the laser interface controller 24 modulates and fires the laser beam apparatus which directs distinct laser beam pulses 77 of the laser beam 2 on coated laser shock peening surface 55 at precisely controlled positions on the workpiece. A laser firing system 125 is used for firing the laser beam 2 from the laser unit 31 and includes the motion controller 25 operably connected to the laser controller 24 to fire the laser beam 2 based on axis position feedback from a speed control 129 of the motion controller 25.

Figure 3:
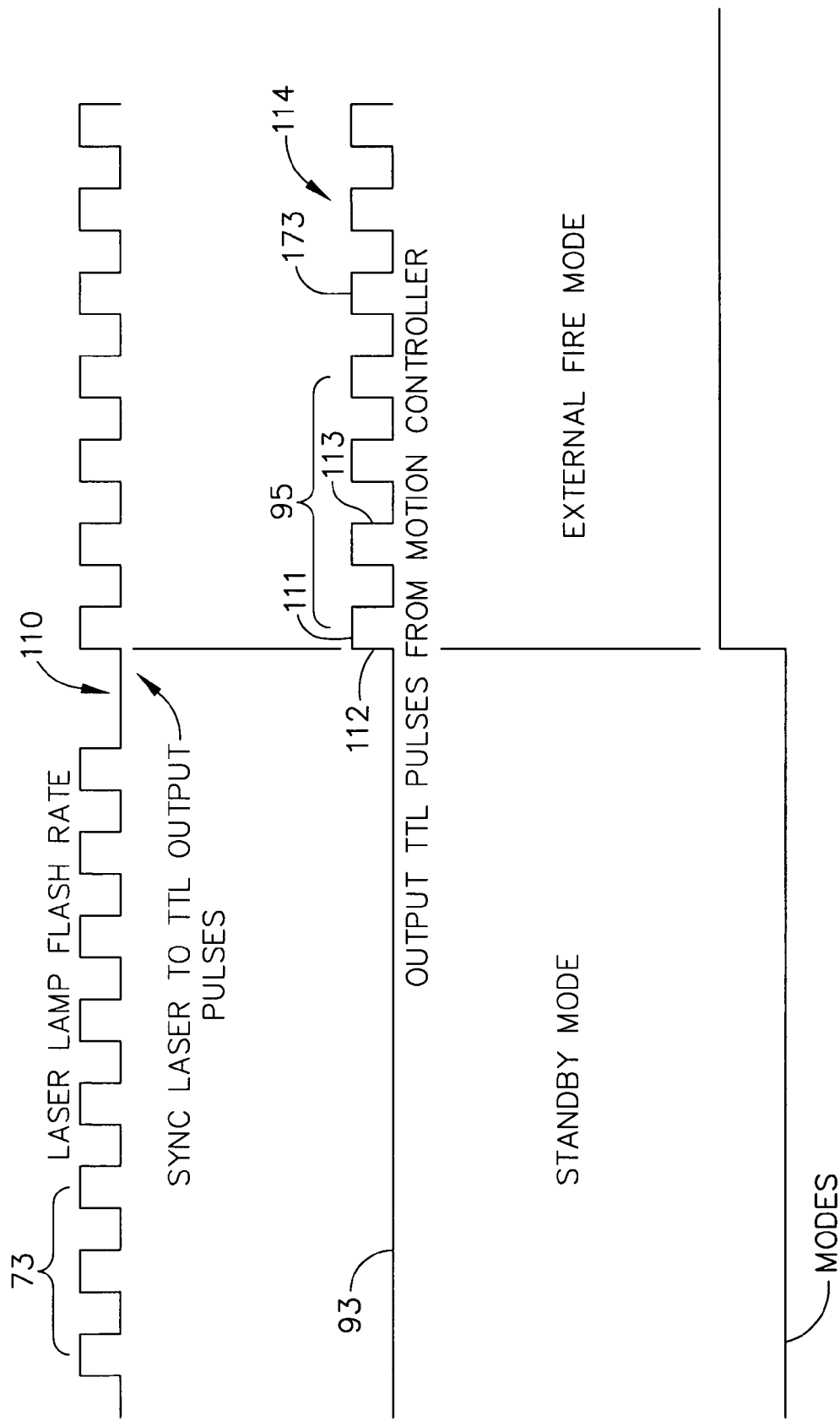
FIG. 3 is a graphical illustration of an operation of the laser illustrated in FIG. 1.
Figure 4:
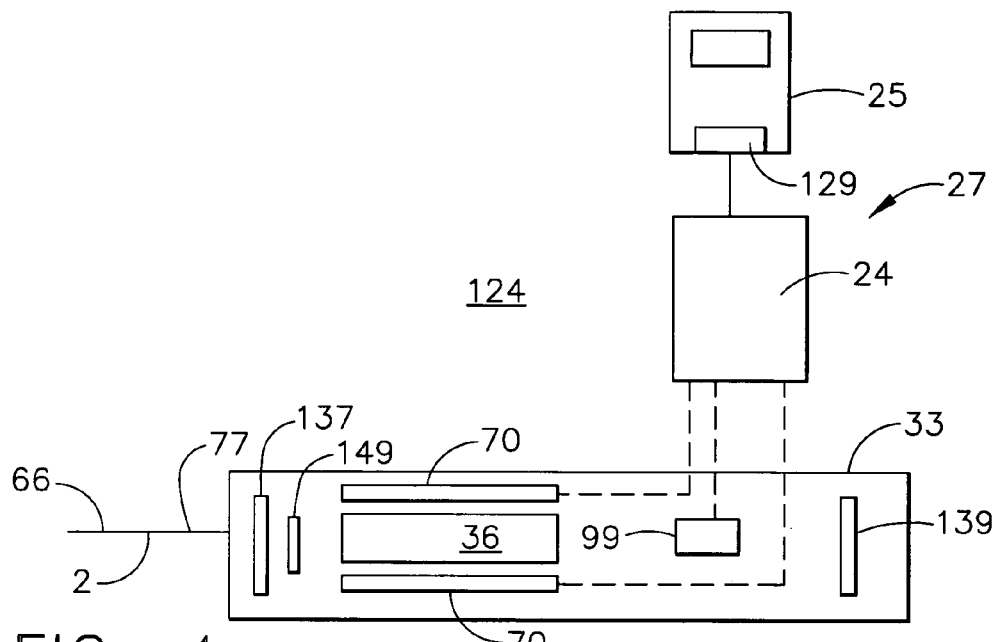
FIG. 4 is a schematical illustration of a first exemplary laser oscillator for the laser shock peening system illustrated in FIG. 1.

Illustrated in FIG. 4 is first exemplary embodiment of the laser firing system 125 which includes at least one flash lamp 70 operably disposed for actuating the lasing rod 36 in the laser unit 31. The laser controller 24 has first and second modes for modulating and firing the laser beam 2 from the laser unit 31 as illustrated in FIG. 3. The first mode is a standby mode for flashing the flash lamp 70 at a laser lamp frequency or flash rate 73 without triggering the laser beam 2. One exemplary flash lamp frequency or flash rate 73 is about 10 HZ, i.e. 10 cycles or reps per second. In the standby mode, the laser maintains a thermal stability. However, the laser will not produce the laser beam 2 in the form of the laser beam pulses 77 due to the lack of a pulsed triggering signal 93 sent by the laser controller 24 to the oscillator's Q-switch 99. The oscillator's Q-switch 99 is illustrated as a Pocel Cell.

Figure 6:
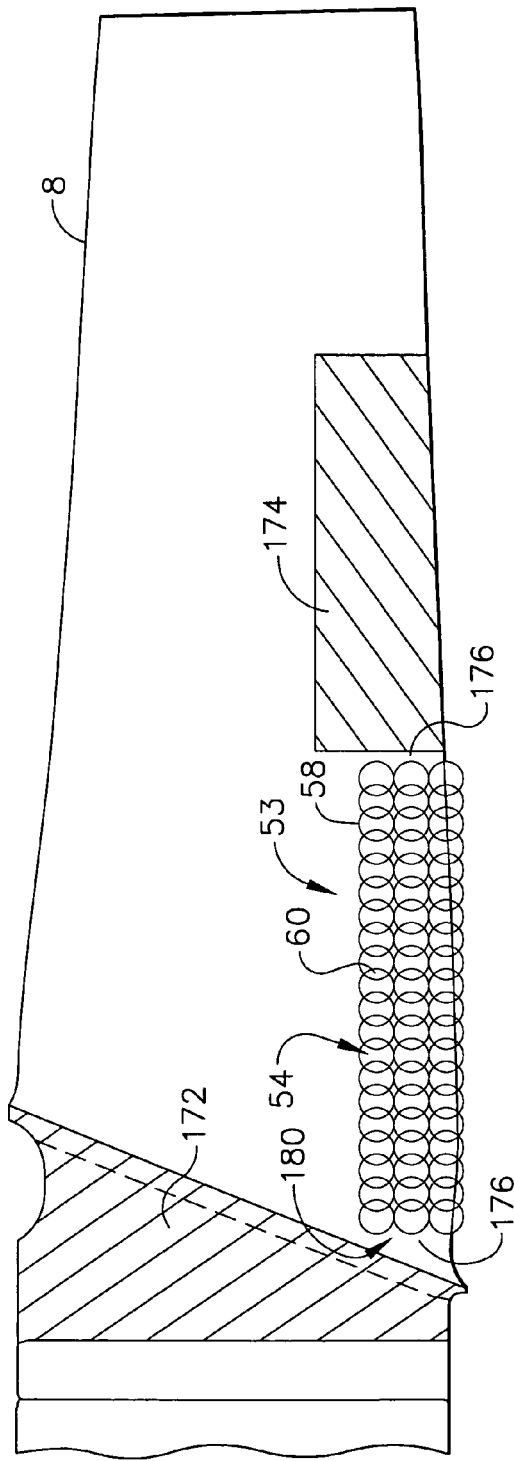
FIG. 6 is a side view illustration of a workpiece for processing in the laser shock peening system illustrated in FIG. 1 with stop and start masks and an exemplary array of laser shock peened spots.

The second mode is a firing mode that fires the laser beam pulses 77. The triggering signal 93 is provided to the laser interface controller 24 by the computerized motion controller 25 to fire the laser beam pulses 77 of the laser beam 2 starting at a precise time during the firing mode. The triggering signal 93 includes a series of triggering pulses 173 having a triggering frequency 95 that is typically matched to the flash lamp frequency or flash rate 73. This will produce evenly spaced laser shock peened spots 58 in a single pass or along a row as illustrated in FIGS. 1, 6, and 7 at the flash lamp frequency or flash rate 73.

Figure 7:
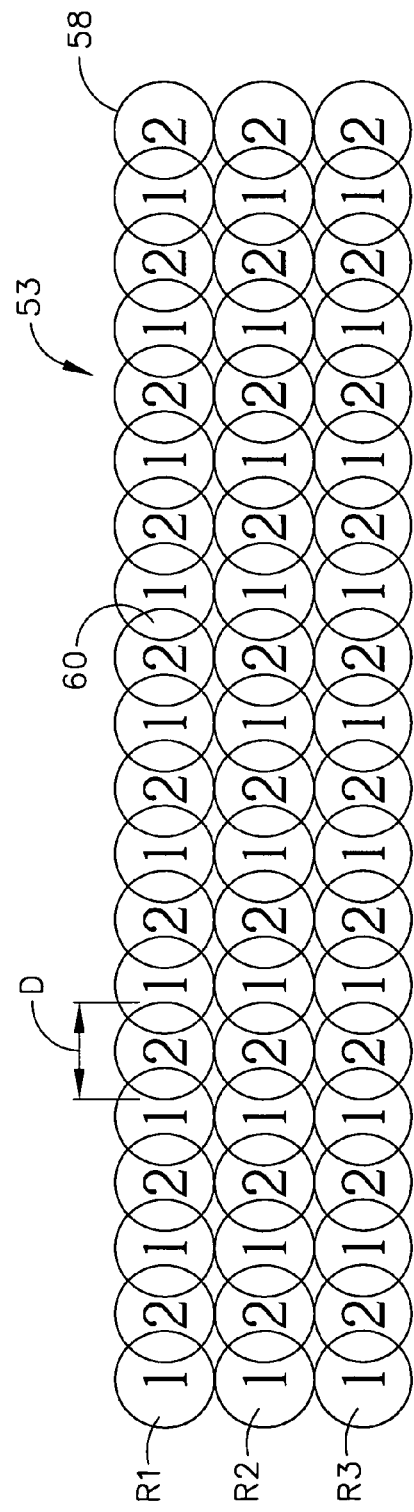
FIG. 7 is a schematical illustration of a sequence of processing the laser shock peened spots illustrated in FIG. 1.

FIG. 7 illustrates a laser shock peened patch 53 on the laser shock peened surface 54 having first, second, and third rows R1, R2, and R3, respectively, of the laser shock peened spots 58. Each of the first, second, and third rows R1, R2, and R3 are made with first, second, and third passes, respectively, in each of first and second sequences 1 and 2. All of the laser shock peened spots 58 in one of the rows during one of the sequences are formed with a single pass of the laser beam 2 over the laser shock peened surface 54.

In the exemplary continuous motion laser shock peening method illustrated herein each pass in each sequence forms a row of spaced apart non-overlapping laser shock peened spots 58, i.e the laser shock peened spots 58 in the first row R1 of sequence 1. A pattern of overlapping laser shock peened spots 58 in any of the rows are formed using during different passes of different sequences. In the exemplary continuous motion laser shock peening method illustrated herein, the first, second, and third rows R1, R2, and R3 of the overlapping laser shock peened spots 58 are made with first, second, and third passes, respectively, in each of the first and second sequences 1 and 2. Each row of the overlapping laser shock peened spots 58 is made with two passes but more may be used.

Many variations of number of row, sequences, layers of rows (multiple passes along each row), and amount of overlap 60 between adjacent laser shock peened spots in a row or in different rows. The pattern of laser shock peened spots 58 in the exemplary laser shock peened patch 53 illustrated herein has three rows wherein adjacent ones of the laser shock peened spots 58 in each row, such as row R2, overlap by about 30% but do not overlap the laser shock peened spots 58 in adjacent rows, such as in rows R1 and R3. Many variations of the pattern of laser shock peened spots 58 in the laser shock peened patch 53 are possible and many are well known in the art. The pattern of the laser shock peened spots 58 may alternatively include the laser shock peened spots 58 in adjacent rows may overlap or adjacent ones of the laser shock peened spots 58 in each row and those of adjacent rows may overlap. Overlaps 60 of 10% to 50% are known to be used for laser shock peening. It may be desirable to provide a laser shock peened patch with one or more rows of non-overlapping laser shock peened spots 58 such as disclosed in U.S. Pat. No. 6,159,619 entitled "Ripstop Laser Shock Peening".

Each one of the laser shock peened spots 58 is formed by a single one of the laser beam pulses 77 which is fired based on the triggering pulses 173 of triggering signal 93 at the triggering frequency 95 that is typically matched to the flash lamp frequency or flash rate 73. The triggering frequency 95 is also related to the feed rate of the laser shock peened surface 54 of the workpiece 8 that is held by the manipulator 127 and controlled by the computerized motion controller 25. [0001] The laser controller 24 is programmed to provide a synchronizing means 27 for synchronizing the triggering signal 93 and the laser lamp flash rate 73 substantially at a time substantially when the laser beam pulse 77 is generated as illustrated in FIG. 3. The triggering signal 93 is based on the motion controller's positioning of the workpiece. The exemplary motion controller 25 illustrated herein provides a TTL signal (transistor logic signal) also referred to as a motion control signal. The motion control signal which serves as the triggering signal 93 indicates the positioning of the workpiece and, thus, the relative position of the laser beams 2 on the workpiece. At the time of firing (i.e. the time the triggering signal 93 is sent by the computerized motion controller 25 to the laser interface controller 24) the laser lamp flash rate 73 and the triggering signal 93 (i.e. the TTL signal) are synched up.

The exemplary laser unit 31 is representative of a low power laser having a rated power typically in a range of 2.5 to 5 Joules (J). Other suitable low power ranges include 0.5 J to 10 J. The continuous laser shock peening method disclosed herein includes the laser shock peened spot 58 having diameters D in a range of about 0.5 mm to 3 mm. The exemplary laser unit power used herein is 4 J and the laser shock peened spot 58 have diameters D about 1.85 to 1.95 mm.

When the laser controller 24 receives the first pulse 112 of the 10 Hz triggering signal 93 from the motion controller 25, it synchronizes the laser lamp flash rate 73 and the triggering signal 93 and switches to the second mode or firing mode that fires the laser beam pulses 77. At this time, the flash lamp rate 73 and the triggering signal 93 from the laser controller 24 will be synchronized. This is illustrated in FIG. 3 by a waveform stutter 110 of the flash lamp rate 73 to synchronize it with the triggering signal 93. The laser may not produce a desirable laser beam pulse 77 for a first pulse 112 (or more) of the triggering signal 93 depending on when the triggering signal 93 is received in relation to the flash lamp rate 73. The first pulse 112, or more if desired, serves as a header 111 for the triggering signal 93 to allow sufficient time for the laser lamp flash rate 73 and the triggering signal 93 to synchronize. The laser controller 24 or the motion controller 25 is programmed to start firing the laser beam pulses 77 on the second pulse 113 (or a higher number) after the header 111 by sending the triggering pulses from the laser controller 24 to a laser trigger mechanism illustrated in FIG. 4 as the oscillator's Q-switch 99. The header 111 causes the laser controller 24 to delay firing the laser beam pulses 77 for at least the first pulse 112 of a train 114 of the triggering signal 93. The laser will return to the standby mode when the train 114 of the triggering signal 93 from the motion controller 25 ends (one for each pass). Each pass for each row of laser shock peened spots corresponds to one train of the triggering signal 93.

Two exemplary laser trigger mechanisms that trigger the laser beam pulses 77 are illustrated herein. A first exemplary laser trigger mechanism 124 is illustrated in FIG. 4. The oscillator 33 of the laser unit 31 includes the lasing rod 36 operably disposed between front and rear mirrors 137 and 139 and the flash lamp 70. A shutter 149 is disposed between the front mirror 137 and the lasing rod 36 and the Q-switch 99 which serves as the first exemplary laser trigger mechanism 124 is located between the lasing rod 36 and the rear mirror 139. The Q-switch 99 and the shutter 149 are controllably connected to the laser controller 24. The laser controller 24 sends the triggering pulses 173 to the oscillator's Q-switch 99 in order to fire the laser beam pulses 77.

Figure 5:
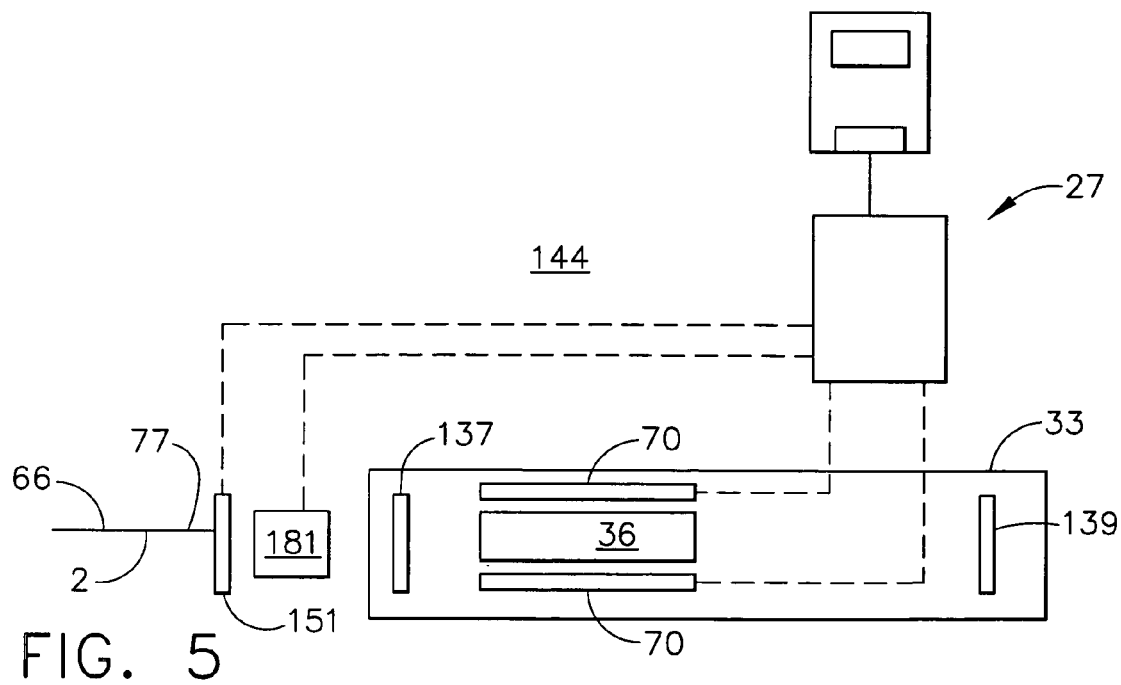
FIG. 5 is a schematical illustration of a second exemplary laser oscillator for the laser shock peening system illustrated in FIG. 1.

A second exemplary laser trigger mechanism 144 is illustrated in FIG. 5. The oscillator 33 illustrated in FIG. 5 includes the lasing rod 36 operably disposed between front and rear mirrors 137 and 139 and the flash lamp 70. A slicer in the form of a double Pocel cell 181 is disposed between a high speed shutter 151 outside of the oscillator 33 along the laser beam path 66. The second exemplary laser trigger mechanism 144 includes the double Pocel cell 181 and the high speed shutter 151 which are controllably connected to the laser controller 24. The laser controller 24 sends the triggering pulses 173 to the double Pocel cell 181 in order to fire the laser beam pulses 77. The high speed shutter 151 is slaved to the double Pocel cell 181. The high-speed shutter 151 prevents bleed through energy from being amplified by the later stages of the laser and create an unwanted low energy pulse out of the laser. The second exemplary laser trigger mechanism 144 provides greater stability for the oscillator's laser output from the first laser shot to the last one as compared to laser output using the first exemplary laser trigger mechanism 124. This greater stability is evidenced by more constant and consistent energy and laser pulse parameters which are generally effected by thermal instability.

The computerized motion controller 25 and the laser interface controller 24 can be setup so that the electrical triggering pulses 173 are generated at a predetermined spacing of one or more of the translational axes to fire the laser beam pulses 77 of the laser beam 2 at a precise time during the firing mode. This is accomplished by scaling known encoder counts (which can also serve directly as the triggering signal 93) which are per desired distance, with laser beam pulses 77 generated at that time, or programming an output from the motion controller 25 at a desired location on the workpiece 8 with equal spacing and feed rate to accommodate the triggering pulses 173 having a triggering frequency 95 that is typically matched to the flash lamp frequency or flash rate 73. This will provide accurate repeatability of spacing for multiple rows of the laser shock peened spots 58 to be located directly in relation to spots of preceding rows.

When processing a workpiece 8 that may not be able to tolerate a first laser beam pulse 77 miss then start and stop masks 172 and 174, respectively, may be placed at distal ends 176 of a patch area 180 where the laser shock peened patch 53 is to be formed on the laser shock peened surface 54 as illustrated in FIG. 6. When using the start and stop masks, the first laser beam pulse 77 (or more) can be fired on the mask with every proceeding spot on the workpiece between the two masks. On each pass of the laser beam 2 on the laser shock peening surface 55 at least a first one of the laser beam pulses 77 hits the start mask 172. Feed rate can play a critical role, since that will determine output pulse frequency. The exemplary method disclosed herein uses axis position for reference to fire the laser beam pulses 77 not just a constant triggering signal 93 from the computerized motion controller 25. Therefore, when processing surfaces that require contour following precise laser shock peened spot 58 location can be achieved.

The continuous motion shock peening process and apparatus 10 can be used to produce a hybrid laser shock peened patch made up of the laser shock peened spots 58 having different percentages of overlap 60 with in a row or between rows. The hybrid patch uses a constant energy and spot size, but varies the amount of overlap 60 on the workpiece. A big advantage of the hybrid patch is that, LSP effect can be varied with the need of change depending on the workpiece without adding extra layers. For example, applying the same percent of overlap 60 of spots to an entire area of a workpiece having variances in material thickness may work well for one area but could distort another area of the laser shock peened surface or path. In such a case, the energy of the laser beam may be increased to provide good LSP effect but in thinner sections of the workpiece distortion becomes a problem. Often a second layer is used in a local thick portion of the workpiece to gain LSP effect in that area. The hybrid patch can reduce the process to a single layer. The pattern of the laser shock peened spots 58 may include only adjacent ones of the laser shock peened spots 58 in each row overlapping, only the laser shock peened spots 58 in adjacent rows overlapping, or adjacent ones of the laser shock peened spots 58 in each row and those of adjacent rows overlapping.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A continuous motion laser shock peening apparatus comprising:
   a laser unit for generating a laser beam for laser shock peening a workpiece,
   a motion controller controllably connected to a manipulator for continuously moving and positioning the workpiece,
   a laser controller for modulating and firing the laser beam from the laser unit,
   a laser firing system for firing the laser beam from the laser unit, and
   the motion controller operably connected to the laser controller to fire the laser beam based on axis position feedback from a speed control of the motion controller.

2. An apparatus as claimed in claim 1 further comprising:
   at least one flash lamp operably disposed for actuating a lasing rod in the laser unit,
   the laser controller having first and second modes for modulating and firing the laser beam from the laser unit,
   the first mode being a standby mode for flashing the flash lamp at a flash rate without triggering the laser beam, and
   the second mode being a firing mode that triggers and fires the laser beam in laser beam pulses.

3. An apparatus as claimed in claim 2 further comprising a synchronizing means for synchronizing a triggering signal provided to the laser interface controller by the computerized motion controller to fire laser beam pulses of the laser beam and the flash rate of the flashing of the flash lamp at a time substantially when the laser beam pulses are to be generated.

4. An apparatus as claimed in claim 3 further comprising the motion controller operably connected to the laser controller and programmed to fire the laser beam based on a predetermined spacing along one or more axes of the manipulator.

5. An apparatus as claimed in claim 4 wherein the predetermined spacing is based on encoding counts generated by the motion controller and representing distances along the axes.

6. An apparatus as claimed in claim 3 further comprising the computerized motion controller operable to send the triggering signal and the laser controller operable to flash the flash lamp at the same frequency.

7. An apparatus as claimed in claim 6 further comprising the motion controller operably connected to the laser controller and programmed to fire the laser beam based on a predetermined spacing along one or more axes of the manipulator.

8. An apparatus as claimed in claim 7 wherein the predetermined spacing is based on encoding counts generated by the motion controller and representing distances along the axes.

9. An apparatus as claimed in claim 2 further comprising:
an oscillator including a lasing rod operably disposed between front and rear mirrors and the flash lamp,
the oscillator further including a shutter disposed between front mirror and the lasing rod and a Q-switch located between the lasing rod and the rear mirror, and
the Q-switch controllably connected to the laser controller for triggering and firing the laser beam pulses.

10. An apparatus as claimed in claim 9 further comprising the laser controller including a synchronizing means for synchronizing the laser beam pulse to the flash rate of the flashing of the flash lamp at a time substantially when the laser beam pulse is generated.

11. An apparatus as claimed in claim 10 further comprising the motion controller operably connected to the laser controller to fire the laser beam based on a predetermined spacing along one or more axes of the manipulator.

12. An apparatus as claimed in claim 11 wherein the predetermined spacing is based on encoding counts generated by the motion controller and representing distances along the axes.

13. An apparatus as claimed in claim 2 further comprising:
an oscillator including a lasing rod operably disposed between front and rear mirrors and the flash lamp,
a double Pocel Cell positioned directly between the oscillator and a high speed shutter along a beam path leading out of the oscillator, and
the laser controller controllably connected to the double Pocel Cell and the high speed shutter for triggering and firing the laser beam pulses.

14. An apparatus as claimed in claim 13 further comprising the laser controller including a synchronizing means for synchronizing the laser beam pulse to the flash rate of the flashing of the flash lamp at a time substantially when the laser beam pulse is generated.

15. An apparatus as claimed in claim 14 further comprising the motion controller operably connected to the laser controller to fire the laser beam based on a predetermined spacing along one or more axes of the manipulator.

16. An apparatus as claimed in claim 15 wherein the predetermined spacing is based on encoding counts generated by the motion controller and representing distances along the axes.

17. An apparatus as claimed in claim 3 wherein the triggering signal provided to the laser interface controller by the computerized motion controller includes a header and one of the laser controller and the motion controller is programmed to start firing the laser beam pulses after the header.

18. A continuous motion laser shock peening method comprising:
firing laser beam pulses of the laser beam on a laser shock peening surface of a workpiece with a laser unit having an oscillator to form at least a first row of laser shock peened spots with at least a single pass of the laser beam on the laser shock peening surface,
modulating and controlling the laser unit with a laser interface controller to fire the laser beam on the laser shock peening surface,
continuously moving and positioning the workpiece with a manipulator controlled by a computerized motion controller, and
firing the laser beam pulses based on axis position feedback from a speed control of the motion controller to the laser controller.

19. A method as claimed in claim 18 further comprising operating the laser controller in first and second modes wherein the first mode is a standby mode for flashing a flash lamp of the oscillator at a flash rate without triggering the laser beam and the second mode is a firing mode that fires the laser beam pulses.

20. A method as claimed in claim 19 further comprising sending a triggering signal from the computerized motion controller to the laser interface controller and synchronizing the triggering signal and the flash rate at a time substantially when the laser beam pulse are to be generated in the firing mode.

21. A method as claimed in claim 20 further comprising placing a header on the triggering signal wherein the header delays the computerized motion controller from firing the laser beam pulse for at least a first pulse of a train of the triggering signal.

22. A method as claimed in claim 18 wherein the triggering signal is based on a predetermined spacing along one or more axes of the manipulator.

23. A continuous motion laser shock peening method comprising:
firing laser beam pulses of the laser beam on a laser shock peening surface of a workpiece with a laser unit having an oscillator and using at least first and second passes of the laser beam on the laser shock peening surface to form a laser shock peened patch having multiple rows of laser shock peened spots,
modulating and controlling the laser unit with a laser interface controller to fire the laser beam on the laser shock peening surface,
continuously moving and positioning the workpiece with a manipulator controlled by a computerized motion controller, and
firing the laser beam pulses based on axis position feedback from a speed control of the motion controller to the laser controller.

24. A method as claimed in claim 23 further comprising operating the laser controller in first and second modes wherein the first mode is a standby mode for flashing a flash lamp of the oscillator at a flash rate without triggering the laser beam and the second mode is a firing mode that fires the laser beam pulses.

25. A method as claimed in claim 24 further comprising sending a triggering signal from the computerized motion controller to the laser interface controller and synchronizing the triggering signal and the flash rate substantially at a time substantially when the laser beam pulse are to be generated in the firing mode.

26. A method as claimed in claim 25 further comprising placing a header on the triggering signal wherein the header delays the computerized motion controller from firing the laser beam pulses for at least a first pulse of a train of the triggering signal.

27. A method as claimed in claim 25 further comprising placing start and stop masks at distal ends of a patch area where the laser shock peened patch is to be formed on the laser shock peened surface and firing at least a first one of the laser beam pulses on the start mask on each pass of the laser beam on the laser shock peening surface.

28. A method as claimed in claim 25 wherein the triggering signal is based on a predetermined spacing along one or more axes of the manipulator.

29. A method as claimed in claim 23 further comprising the laser shock peened patch being a hybrid patch having overlapping laser shock peened spots with different percentages of overlap.

30. A method as claimed in claim 29 further comprising operating the laser controller in first and second modes wherein the first mode is a standby mode for flashing a flash lamp of the oscillator at a flash rate without triggering the laser beam and the second mode is a firing mode that fires the laser beam pulses.

31. A method as claimed in claim 30 further comprising sending a triggering signal from the computerized motion controller to the laser interface controller and synchronizing the triggering signal and the flash rate substantially at a time substantially when the laser beam pulse are to be generated in the firing mode.

32. A method as claimed in claim 31 further comprising placing a header on the triggering signal wherein the header delays the computerized motion controller from firing the laser beam pulses for at least a first pulse of a train of the triggering signal.

* * * * *